Sept. 13, 1927.         W. P. DOYLE         1,642,143
                        SEPARABLE RIM
                       Filed April 2, 1923

Inventor:
William P. Doyle.
By Fred'k J. Ramm
   Attorney.

Patented Sept. 13, 1927.

1,642,143

UNITED STATES PATENT OFFICE.

WILLIAM P. DOYLE, OF MAPLEWOOD, MISSOURI.

SEPARABLE RIM.

Application filed April 2, 1923. Serial No. 629,321.

My invention relates to separable rims for motor vehicle tires, and is a distinct and practical improvement to overcome certain practical objections to, and defects in, separable rims of the present type.

The primary object of my invention is to provide a separable tire carrying rim consisting of two sections.

A further object of the invention is the provision of lug and socket means upon the inner edges of the rim sections to prevent circumferential displacement for the inner rim section with relation to the outer rim section, which is locked against displacement by means of the usual rim lock bolts.

With the above and other objects in view, the invention consists in the novel features of construction, arrangement and combination of parts hereinafter fully described and finally pointed out in the claims hereto appended.

Referring to the accompanying drawings forming a part of this specification, wherein like characters of reference denote similar parts throughout the several views.

Figure 1:
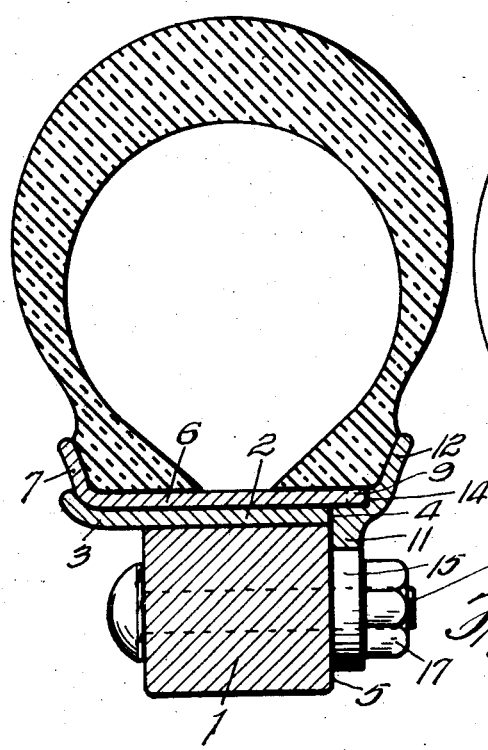
Fig. 1, is a cross sectional view of a separable rim embodying my invention.
Figure 2:
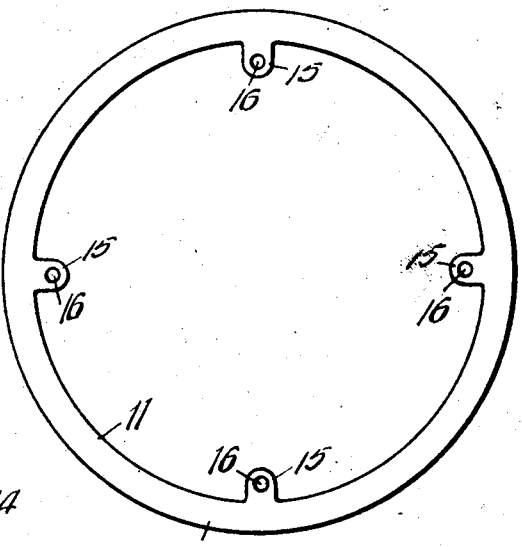
Fig. 2, is an outer side elevation of the rim.

Referring to the drawings, 1 represents the felly of a motor vehicle wheel of the conventional type which is provided with the usual fixed metallic felly rim 2 having the projecting separable rim stop flange 3 at its inner edge. The outer edge 4 of the rim 2 lies flush with the outer face 5 of the felly 1, as clearly shown in Figs. 1 and 3, whereas the flanged inner edge projects beyond the inner face of the felly 1.

Figure 3:
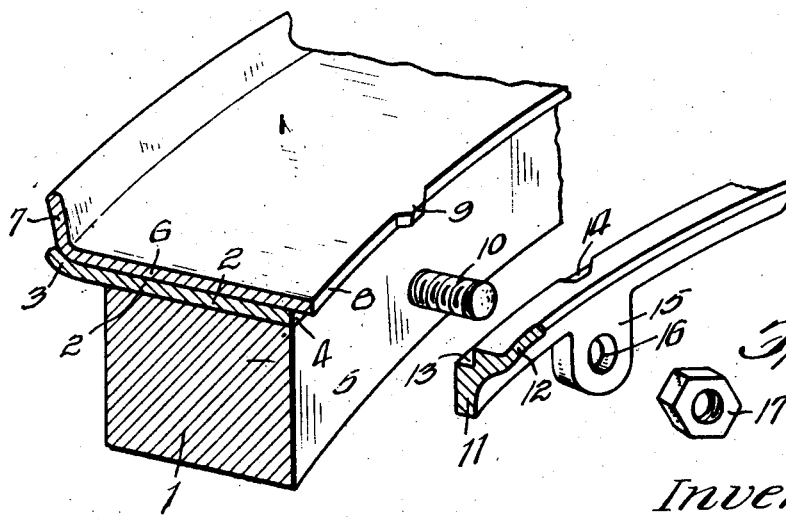
Fig. 3, is a cross sectional view in perspective of the rim with the parts thereof separated.

6 represents the inner section of the separable rim which is provided with the usual projecting tire bead engaging flange 7 at its inner edge. The outer edge 8 of the separable rim section 6 extends beyond the outer edge of the fixed rim 2 and is provided with a plurality of spaced, preferably tapered integral lugs 9, said lugs adapted to be positioned adjacent each felly bolt 10. Rim section 6 is removably mounted upon the fixed rim 2 of the felly 1, as shown in Figs. 1 and 3.

The outer section of the separable rim comprises a ring like member 11 which is provided with a projecting tire bead engaging flange 12. The outer face of the outer rim section 11 is provided with an angularly shaped circumferential groove 13 to accommodate the outer edge 8 of the inner rim section which projects beyond the outer face of the felly rim 2 and felly 1. The outer face of the outer rim section 11 beyond the groove 13 is provided with a plurality of tapered recesses or sockets 14 to receive and accommodate the laterally projecting lugs 9 of the inner separable rim section 6, as clearly shown in Fig. 3. The outer separable rim section 11 is provided with a plurality of inwardly directed ears 15 each having an opening 16 for receiving the felly bolts 10 each of which bolts is provided with a nut 17 to engage the outer face of the lugs 15 for locking the rim section 11 in position with relation to the inner rim section 6 and the felly 1. It will be here observed that the inner face of the outer rim section engages the outer face 5 of the felly when the rim section 11 is positioned.

It will also be here observed that the lugs 9 of the inner rim section 6 when seated in the sockets 14 of the outer rim section 11, prevent the inner rim section from circumferential displacement upon the felly rim 2 and rotary displacement with relation to the outer rim section 11 due to the fact that the outer rim section is held from rotary displacement by means of the bolts 10.

It will be apparent from the foregoing description and the drawings, that it will be a comparatively easy matter to remove even a so-called "frozen" tire from a circumferentially divided rim constructed in accordance with my invention.

From the foregoing description, it is evident that I provide a separable rim which is simple in construction and operation, comparatively inexpensive in manufacture, applicable to the present type of wheel now provided with a separable rim and highly efficient for the purpose intended.

The many advantages of the herein described invention will readily suggest themselves to those skilled in the art to which it appertains.

I do not wish to be understood as having limited myself to the exact details of construction shown and described, but desire to have it understood that the invention I have shown in the drawings is merely illustrative, as it is manifest that various minor changes may be made in the exact construction and particular arrangement of parts without departing from the spirit of my invention, hence I reserve the right to make any such changes, or modifications as may fairly fall within the scope of the appended claims when fairly construed.

What I claim is:

1. In combination with a felly, having a plurality of equally spaced screw threaded studs, a rim member fixed to the felly with its outer side face lying in a plane with the outer side face of the felly, an inner separable rim section having a tire retaining flange removably mounted upon the fixed rim member and having its outer edge portion extending beyond the outer edge of the fixed rim member, a plurality of equally spaced lugs directed laterally beyond the outer side face of the inner separable rim section and positioned opposite the screw threaded studs, an outer separable rim section having an annular groove to receive the outer side edge portion of the inner separable rim section, recesses formed in the peripheral face of the outer separable rim section to receive said lugs, a plurality of ears disposed opposite the recesses of the outer separable rim section and provided with openings to receive the screw threaded studs and a securing nut for each stud.

2. In a separable tire carrying rim structure, a tire carrying section having a tire retaining flange formed at its outer edge, said section being of a width so as to extend beyond the outer side face of a wheel felly when applied thereto, spaced laterally directed lugs extending from the outer side face of the tire carrying section, a removable section having an annular peripheral groove at the inner edge of its outer face to receive the outer edge of the tire carrying section, a plurality of recesses in the outer face of the removable section having an open inner side communicating with the annular groove to receive and accommodate said laterally directed lugs and a perforated lug disposed within each recess having its inner side face in a plane with the inner side face of the removable rim section.

3. In a separable tire carrying rim structure, a tire carrying section having a tire retaining flange formed at its inner edge, said section being of a width so as to extend beyond the outer side face of a wheel felly when applied thereto, spaced laterally directed lugs extending from the outer side face of the tire carrying section, a removable section having an annular peripheral groove at the inner edge of its outer face to receive the outer edge of the tire carrying section, a plurality of recesses formed in the outer face of the removable section each having an open inner side communicating with the annular groove to receive the laterally directed lugs of the tire carrying section.

In testimony whereof, I have hereunto signed my name to the specification.

WILLIAM P. DOYLE.